US006989864B2

(12) United States Patent
Ohta

(10) Patent No.: US 6,989,864 B2
(45) Date of Patent: Jan. 24, 2006

(54) AUTOMATIC FOCUSING DEVICE FOR FILM SCANNER

(75) Inventor: Yoshinori Ohta, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 797 days.

(21) Appl. No.: 10/080,690

(22) Filed: Feb. 25, 2002

(65) Prior Publication Data

US 2002/0080258 A1    Jun. 27, 2002

Related U.S. Application Data

(62) Division of application No. 08/900,118, filed on Jul. 25, 1997.

(30) Foreign Application Priority Data

Jul. 26, 1996   (JP)   ................................. 8-197809
Aug. 16, 1996   (JP)   ................................. 8-216390

(51) Int. Cl.
*G03B 13/00*   (2006.01)

(52) U.S. Cl. .................... 348/345; 348/96; 348/356

(58) Field of Classification Search ................ 348/345, 348/347, 349, 354, 355, 356, 209.99, 96, 348/97, 224.1; 355/50; 358/474, 527; 250/201.2, 250/201.3, 201.4; 396/310, 311
See application file for complete search history.

(56) References Cited

U.S. PATENT DOCUMENTS

| 5,486,895 A | * | 1/1996 | Leidig et al. | .................. 355/50 |
| 5,568,273 A | * | 10/1996 | Sato et al. | .................. 358/451 |
| 5,852,503 A | * | 12/1998 | Kawaoka | ..................... 358/527 |
| 5,874,994 A | | 2/1999 | Xie et al. | |
| 5,959,665 A | | 9/1999 | Hibino et al. | |
| 6,434,339 B1 | * | 8/2002 | Saito et al. | .................. 396/311 |

FOREIGN PATENT DOCUMENTS

| EP | 180186 A | * | 5/1986 |
| JP | A61-41277 | | 2/1986 |
| JP | A63-215268 | | 9/1988 |
| JP | A64-7774 | | 1/1989 |
| JP | 4-046471 | | 2/1992 |
| JP | 04046471 A | * | 2/1992 |

* cited by examiner

*Primary Examiner*—Aung Moe
(74) *Attorney, Agent, or Firm*—Birch, Stewart, Kolasch & Birch, LLP

(57) ABSTRACT

An image recorded on a photo film is projected through an imaging lens onto an image sensor. In accordance with a selected mode, set values are read out from a data ROM and are applied to a band pass filter having programmable digital filters. Pixel signals from the image sensor are converted into evaluation signals that are correlative with spatial frequencies of the image, and are filtered through the band pass filter with the frequency band determined by the set values. The evaluation signals are integrated, and a peak value of integration values obtained at different focusing positions is determined to be an in-focus position.

8 Claims, 11 Drawing Sheets

| ADDRESS | SET VALUE DATA | |
|---|---|---|
| 0001 | $K_{H0}$ | $K_{L1}$ |
| 0002 | $K_{H0}$ | $K_{L2}$ |
| 0003 | $K_{H0}$ | $K_{L3}$ |
| 1001 | 1 | 1 |
| 1002 | $a_1$ | $b_1$ |
| 1003 | $a_2$ | $b_2$ |
| 1004 | $a_3$ | $b_3$ |
| 1005 | $a_4$ | $b_4$ |
| 1006 | $a_5$ | $b_5$ |
| 1007 | $a_6$ | $b_6$ |

Rows 0001–0003: INITIAL SET VALUE DATA
Rows 1001–1007: ZOOMING CORRECTION DATA

ZOOM UP

AUTOMATIC FOCUSING DEVICE FOR FILM SCANNER

This is a divisional of Ser. No. 08/900,118, filed Jul. 25, 1997.

BACKGROUND OF THE INVENTION

1. Field of the Invention

The present invention relates to an automatic focusing device for a film scanner which picks up image signal from an image photographed on negative or positive film.

2. Background Arts

The film scanner is used for picking up image signal from photographic image in order to simulate the photographic image as a video image on a monitor, or to make a hard copy of the photographic image through a video printer. The film scanner has an image sensor or a solid state imaging device which scans the film surface to photoelectrically convert the photographic image into electric signal. The electric signal is processed into appropriate image signal.

An imaging lens is disposed in between the film surface and the image sensor, so that the photographic image is focused on a photoelectric conversion surface of the image sensor. In the film scanner, the filmstrip is held in a film carrier which is placed at a substantially constant distance from the imaging lens. Therefore, the imaging lens of the film scanner needs not cover such a wide focusing range as necessary for ordinary video cameras and electric still cameras. But it is still necessary to adjust the focus of the imaging lens as the distance to the film surface can vary depending upon the type of filmstrip as having different thickness, or when the film carrier is interchanged.

Automatic focusing devices have been known in the art. For example, JPA 61-41277, JPA 63-215268 and JPA 1-7774 disclose an automatic focusing device which basically scan the photographic image and samples changes or differences in density of the image between sampling positions, and produces evaluation signal which correlates the sampled differences with their sampling number. Then, the evaluation signal is integrated. While changing the focal point of the imaging lens, the automatic focusing device detects integration value of the evaluation signal at regular intervals, and checks increment or decrement of the integration value to find out a peak of the integration value. The imaging lens is set at a position where the integration value is at the peak. This is because the peak of the integration value of the evaluation signal indicates the in-focus position of the imaging lens.

FIG. 13 shows magnitude distribution curves of the evaluation signal with respect to spatial frequency, wherein the spatial frequency corresponds to the sampled difference or the change between the sampled densities, while the magnitude of evaluation signal corresponds to the sampling number. The three curves are obtained in three different focusing positions: the curve shown by a solid line represents evaluation signal obtained at an out-of-focus position, the curve shown by dashed lines represents evaluation signal at an in-focus position, and the curve shown by chain-dotted lines represents evaluation signal obtained on the way to the in-focus position. The areas bounded by the individual curves correspond to the integration values of the respective evaluation signals. As the imaging lens is being focused on the photographic image, the more evaluation signal is obtained from the higher spatial frequency range, so the integration value of the evaluation signal increases. Accordingly, it is possible to consider that the in-focus position of the imaging lens is where the integration value of the evaluation signal is at the peak. Hereinafter, changing the focusing position for sampling evaluation signal will be referred to as "focus scanning".

FIG. 14 shows relationship between the focusing position of the imaging lens and the integration value of the evaluation signal. A curve C1 represents an ideal curve wherein the peak and thus the in-focus position is definite and easy to determine. In order to obtain such an ideal curve, it is necessary to integrate those evaluation signals which belong to an appropriate spatial frequency band. That is, if a frequency band B1 is optimum for a photographic image, but a too narrow frequency band B2 is selected, as shown in FIG. 15, the curve of the consequent integration value would be as shown by C2. As the curve C2 waves around an actual peak, a subsidiary peak is apt to be mistaken as the peak. If a too wide frequency band B3 is selected in that case, the curve of the consequent integration value would be as shown by C3. The peak of the curve C3 is indefinite, and thus the in-focus position is indefinite.

In general, when the photographic image is low contrast, integration value of the evaluation signal changes gently along with the focusing, as shown by the curve C3. On the contrary, where the density of photographic images varies frequently over a wide range, integration value of the evaluation signal changes sharply and unstably in a range around the in-focus position, as shown by the curve C2.

Since the above mentioned prior arts use a band pass filter which selects a predetermined frequency band of the evaluation signal for any kinds of photographic images, it is sometimes difficult to accurately determine the in-focus position. Accordingly, in order to improve the focusing accuracy, it is desirable to select an appropriate frequency band of the evaluation signal in accordance with the photographic image. However, as there are a variety of image patterns, it is difficult to automatically select an optimum frequency band for every photographic image.

In addition, since the imaging lens of the film scanner is often a zoom lens so as to permit scanning a limited portion of the photographic image within a frame, and the spatial frequency components of the signal from the image sensor change with the zooming, it is also necessary for accuracy to adjust the frequency band to the change in spatial frequency of the image signal.

To avoid mistaking the peak when the integration value of the evaluation signal has such a curve as shown by C2 in FIG. 14, the prior arts teaches to move the imaging lens through the entire focusing range while sampling integration values, thereafter determine a peak value of these integration values, and set the imaging lens to the position where the peak is obtained. However, this method is so time consuming that it does not work in practice.

SUMMARY OF THE INVENTION

In view of the foregoing, an object of the present invention is to provide an automatic focusing device for a film scanner, by which the imaging lens is quickly focused on any photographic image without being adversely affected by the image pattern.

Another object of the present invention is to provide an automatic focusing device for a film scanner, by which the imaging lens is automatically focused on the photographic image even after zooming.

To achieve the above objects, according to the present invention, a band pass filter is constituted of programmable digital filters such that the frequency band is adjustable according to externally entered set values.

For a film scanner having a zoom lens as the imaging lens, it is preferable to construct the programmable digital filters such that the frequency band is modified in cooperation with zooming of the imaging lens, because the spatial frequency band of the image changes with the zooming.

To eliminate unnecessary pixel signals, the present invention provides a frame size designating means for designating an effective image area on the photo film; an evaluation area defining means for defining an evaluation area on the image sensor in accordance with the effective image area; and an evaluation signal producing means for producing evaluation signals from pixel signals obtained from the evaluation area.

For quick focusing, the present invention provides a film type identification means for identifying film type of the photo film; a focus-scan range defining means for defining a focus-scan range in accordance with the film type; and a sampling means for sampling pixel signals from the image sensor while the focusing position of the imaging lens is moved through the focus-scan range. If the photo film is negative, a narrower focus-scan range is selected because the variation in distance from the negative film to the imaging lens is relatively small. If the photo film is positive, a wider focus-scan range is selected because the variation in distance from the positive film to the imaging lens is relatively large.

It is preferable to move a focusing lens of the imaging lens at a high speed to make a rough sampling of the integration values when a wider focus-scan range is defined, and then at a low speed in a range around a peak position determined by the rough sampling.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIGS. 11 and 12 show a flow chart illustrating a focusing process according to the second embodiment, wherein FIG. 11 shows a first stage prior to a focus scanning, and FIG. 12 shows a second stage from the start of focus scanning;

DETAILED DESCRIPTION OF THE PREFERRED EMBODIMENT

Figure 1:
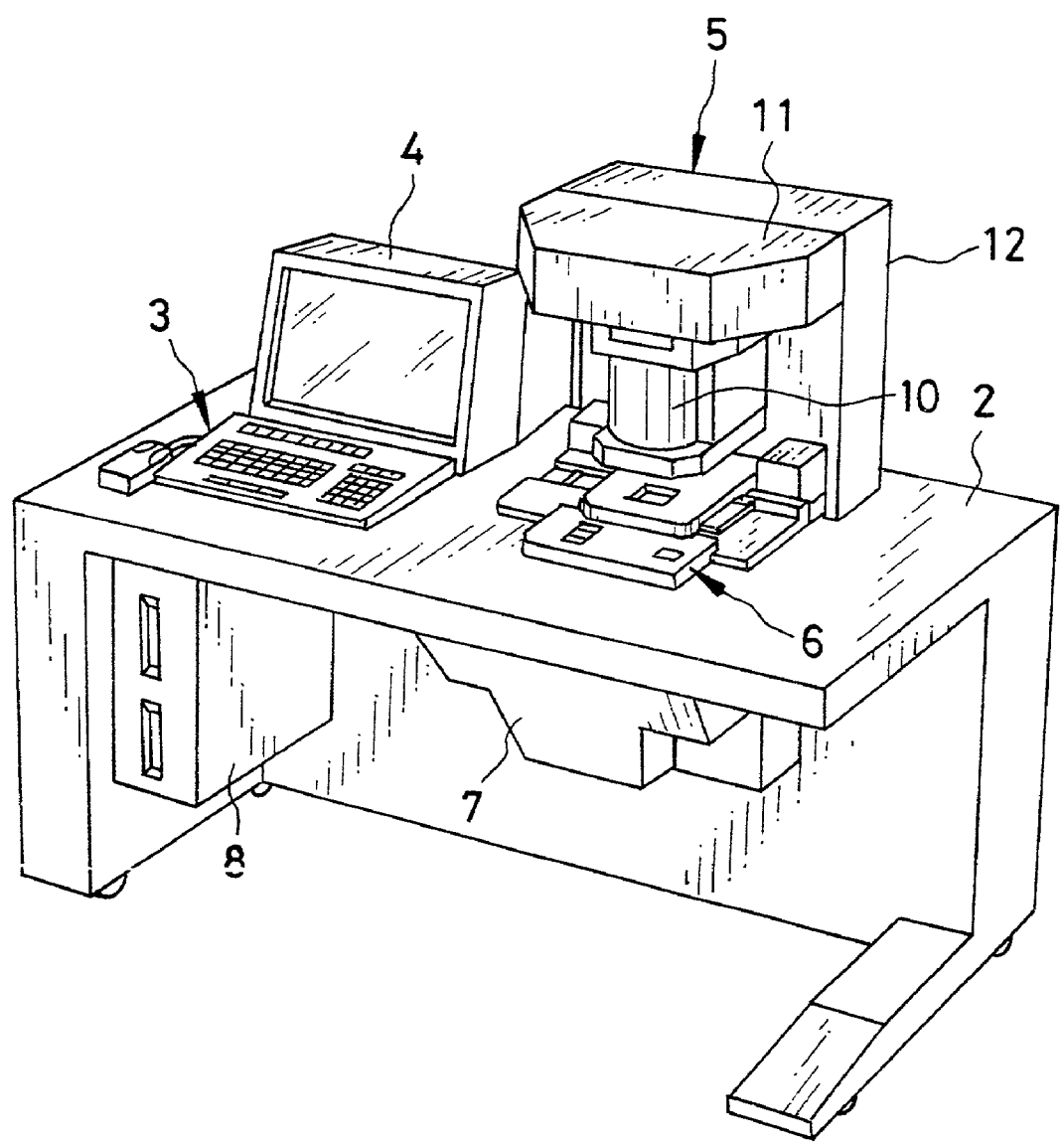
FIG. 1 is a perspective view of a film scanner.

In FIG. 1, a film scanner is constituted of a table 2, a user interface 3 such as a keyboard and a mouse, a CRT monitor 4, an imaging unit 5, a film carrier 6, a light source unit 7 and a disc driver unit 8. The imaging unit 5 consists of an imaging lens 10 with a zooming function, an imaging section 11 accommodating an image sensor 20 (see FIG. 2), and a circuit section 12 for controlling the film scanner and processing signals. The disc driver unit 8 is loaded with system discs storing basic programs. The basic programs are activated in response to an activation command from the user interface 3.

Figure 2:
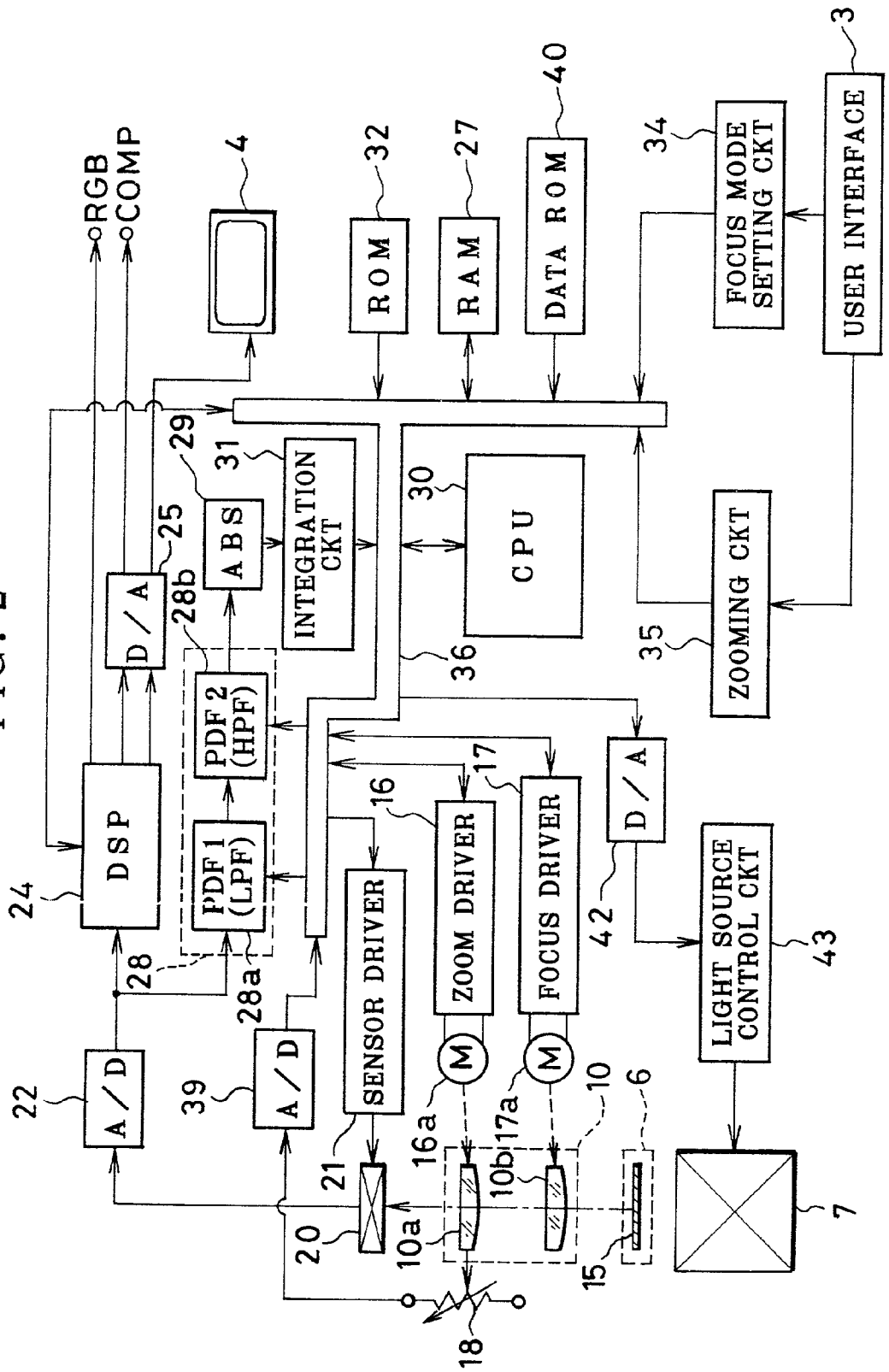
FIG. 2 is a block diagram of a film scanner having an automatic focusing device according to a first embodiment of the invention.

FIG. 2 shows the construction of the imaging unit 5. The film carrier 6 with a photo filmstrip 15 therein is placed in between the light source unit 7 and the imaging lens 10. The light source unit 7 illuminates the filmstrip 15 from the back. The imaging lens 10 consists of a zooming lens 10a and a focusing lens 10b, which are moved along the optical axis for zooming and focusing respectively. A zoom driver 16 and a focus driver 17 are used for moving the respective lenses 10a and 10b by driving stepping motors 16a and 17a. The zooming lens 10a is provided with a potentiometer 18 as a zooming position detector. The potentiometer 18 changes its resistance in cooperation with the movement of the zooming lens 10a, so that a voltage signal corresponding to the zooming position is generated.

The image sensor 20 is disposed in an image forming plane of the imaging lens 10. The image sensor 20 is a solid state imaging device such as a CCD, which has a photo-electric conversion surface and three color micro filters arranged in a mosaic matrix on the photo-electric conversion surface. Three color separated lights through the filters are converted into electric charges in individual pixels of the image sensor 20. A sensor driver 21 is provided for driving the image sensor 20 and reading the charges stored in the respective pixels in form of time sequential pixel signal.

The pixel signal from the image sensor 20 is converted into a digital signal through an AID converter 22 at a given sampling frequency. The digital signal is time sequentially sent to a digital signal processor (DSP) 24. The digital signal processor 24 reads the digital signal by each color and conducts a matrix operation on it to produce three color image signals and a composite image signal. The digital signal processor 24 also effects γ-correction, adjusts signal levels and color balance. The digital three color image signals are directly output from a three color signal output terminal RGB in response to a read-in command of the operator. The composite image signal is converted into an analog form through a D/A converter 25, and is output from a composite signal output terminal COMP. The composite signal is simultaneously sent to the CRT monitor 4, so the operator can observe a video image simulating the photographic image on the filmstrip 15 as being scanned by the film scanner.

The pixel signal from the A/D converter 22 is also sent to a band pass filter 28. The band pass filer 28 consists of a couple of programmable digital filters 28a and 28b which are connected in cascade. The first stage programmable digital filter (PDF1) 28a is a low pass filter (LPF) which detects differences between the time sequential pixel signal values and outputs only those differences which are not more than a set value KH. The second stage programmable digital filter (PDF2) 28b is a high pass filter (HPF) which passes only those differences which are not less than a set value KL among the differences sent from the first stage programmable digital filter 28a. Accordingly, the band pass filter 28 outputs difference data representative of those differences between the pixel signal values which are included in a range limited by the set values KH and KL. The difference data is processed as evaluation signal.

The difference between the pixel signal values correspond to spatial frequency of the time sequential pixel signal, wherein the larger difference means the higher spatial frequency. Therefore, the band pass filter 28 is to filter out those spatial frequencies out of a band between a low range cut-off frequency fL and a high range cut-off frequency fH from the pixel signal, and output the remaining difference data as evaluation signal, wherein the evaluation signal may have positive or negative values. The high range cut-off frequency fH is determined by the set value KH that is applied as a tap coefficient to the first stage programmable digital filter 28a, whereas the low range cut-off frequency fL is determined by the set value KL that is applied as a tap coefficient to the second stage programmable digital filter 28b.

An absolute value conversion circuit (ABS) 29 detects the absolute values of the evaluation signal at the output of the band pass filter 28, and the absolute values are integrated in an integration circuit 31. The integration value of the evaluation signal corresponds to a sum of the difference data that belongs to the spatial frequency band defined by the cut-off frequencies fL and fH. Focusing of the imaging lens 10 is carried out based on the fact that the integration value of the evaluation signal takes the largest value when the imaging lens 10 is most properly focused on the photographic image on the filmstrip 15.

A CPU 30 sequentially controls the zoom driver 16, the focus driver, the sensor driver 21, the digital signal processor 24, and the band pass filter 28. Basic sequence programs for the operations of the film scanner and reference data for executing the sequence programs are stored in a ROM 32. Various data and flags obtained during the execution of the sequence program are temporarily stored in a work area of a RAM 27, and are revised or updated appropriately. A data bus 36 transmits the data between the CPU 30 and other components of the film scanner.

For the focusing, the CPU 30 reads out the integration value of the evaluation signal from the integration circuit 31 to write it in the RAM 27, and then drives the stepping motor 17a through the focus driver 17 to move the focusing lens 10b by a given amount in one direction along the optical axis. Based on the pick-up signal detected in the next focusing position, an integration value of the evaluation signal is calculated in the same way as above, and is read by the CPU 30. The CPU 30 compares the integration value with the preceding one. If the new one is larger, the CPU 30 moves the focusing lens 10b in the same direction as before, and compares a new integration value with the preceding value. The CPU 30 repeats the same process until a smaller integration value than before is detected. A peak of the integration value is determined in this way, and the focusing lens 10b is stopped at the peak position.

If the initial integration value of the evaluation signal obtained at the next focusing position is smaller than the initial integration value, the moving direction of the focusing lens 10b is reversed, and then the same operation as above is carried out. It is possible to modify the focusing operation in many ways. For example, it is possible to move the focusing lens 10b by a larger amount at one time if the difference from the preceding integration value is large, and by a smaller amount as the difference is getting small.

The CPU 30 also controls the light source unit 7 through the data bus 36, a D/A converter 42 and a light source control circuit 43. For example, when the signal level or the color balance cannot be sufficiently adjusted by the digital signal processor 24, the CPU 30 controls an aperture size or color filters of the light source unit 7 to change the light quantity or the color temperature.

As described above, the low range cut-off frequency fL and the high range cut-off frequency fH of the band pass filter 28 are determined by the tap coefficients KL and KH of the programmable digital filters 28a and 28b. A data ROM 40 stores set value data for determining the low range cut-off frequency fL and the high range cut-off frequency fH of the band pass filter 28. When to change the pass band of the band pass filter 28, the CPU 30 reads out the set value data from the data ROM and revises the tap coefficients KL and KH in accordance with the set value data.

Figures 3, 4:
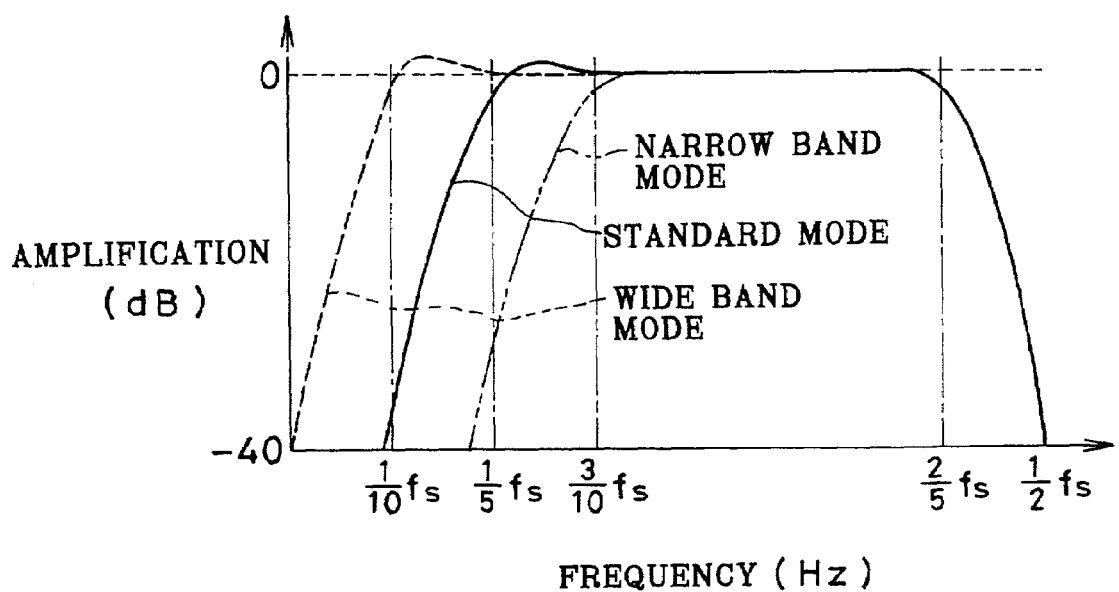
FIG. 3 is a conceptual view of the data ROM of the first embodiment.
FIG. 4 is a diagram illustrating initial frequency bands of a band pass filter set in three manually selected modes.

As shown in FIG. 3, the set value data includes initial set value data and zooming correction data. Three types of initial set value data are stored in memory locations of addresses "0001" to "0003", and several types of zooming correction data are stored in memory locations from address "1001". The three types of initial set value data are predetermined for a narrow band mode, a standard mode and a wide band mode respectively. The operator selects one of these modes through the user interface 3. When the operator selects the narrow band mode, a focus mode setting circuit 34 outputs a corresponding command to the CPU 30, so that the CPU 30 reads the first type initial set value data "KH0, KL1", and sends it to the programmable digital filters 28a and 28b. In result, the tap coefficients of the programmable digital filters 28a and 28b are set at the values KH0 and KL1 respectively. When the operator selects the standard mode, the second type initial set value data "KH0, KL2" is sent to the programmable digital filters 28a and 28b, so that the tap coefficients of the programmable digital filters 28a and 28b are set at the values KH0 and KL2 respectively. When the wide band mode is selected, the tap coefficients of the programmable digital filters 28a and 28b are set to the values KH0 and KL3 respectively.

According to the embodiment shown in FIG. 4, the high range cutoff frequency fH and the low range cut-off frequency fL are set at ($\frac{2}{5}$)fs and ($\frac{3}{10}$)fs in the narrow band mode, ($\frac{2}{5}$)fs and ($\frac{1}{5}$)fs in the standard mode, or ($\frac{2}{5}$)fs and ($\frac{1}{10}$)fs in the wide band mode. Although the high range cut-off frequency fH is common to all modes, it is possible to change it for each mode.

On the other hand, the zooming correction data is for correcting the tap coefficients KH and KL of the programmable digital filters 28a and 28b in accordance with zooming position. When the operator operates a zoom button or the like, a zooming circuit 35 outputs a signal to the CPU 30, so that the zooming lens 10a is moved along the optical axis. With the movement of the zooming lens 10a, the voltage signal from the potentiometer 18 changes. The voltage signal is converted into digital zooming position signal through an A/D converter 39, and is sent to the CPU 30.

Figure 5:
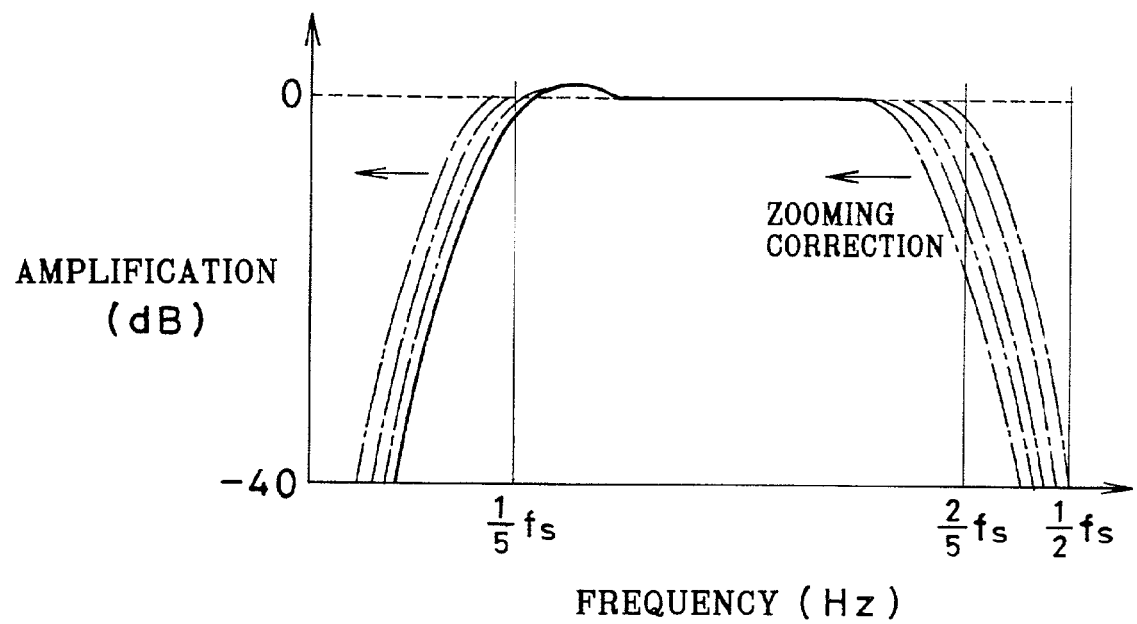
FIG. 5 is a diagram illustrating correction of the initial frequency band in accordance with the zooming position.

The CPU 30 reads out the zooming correction data from the data ROM 40 in accordance with the zooming position signal, and sends it to the programmable digital filters 28a and 28b. For example, when the imaging lens 10 is at a wide-angle terminal, the zooming correction data "1, 1" is applied to the programmable digital filters 28a and 28b, so that the cut-off frequencies fL and fH of the band pass filter 28 remains in the initial set values determined by the selected mode. While the imaging lens 10 is zoomed from the wide-angle terminal to a telephoto terminal, the zooming correction data is read out at each increment of 1 mm in the focal length, seriatim from the memory locations "1002", "1003", "1004"..., so that the zooming correction data "a1, b1", "a2, b2", "a3, b3"... is applied to the programmable digital filters 28a and 28b. Thereby, the cut-off frequencies fL and fH of the band pass filter 28 are shifted toward low frequency range. FIG. 5 illustrates an example of zooming correction in the standard mode, wherein the initial pass band shown by a solid line is shifted stepwise toward the low frequency range as shown by chain-dotted lines.

Figure 6:
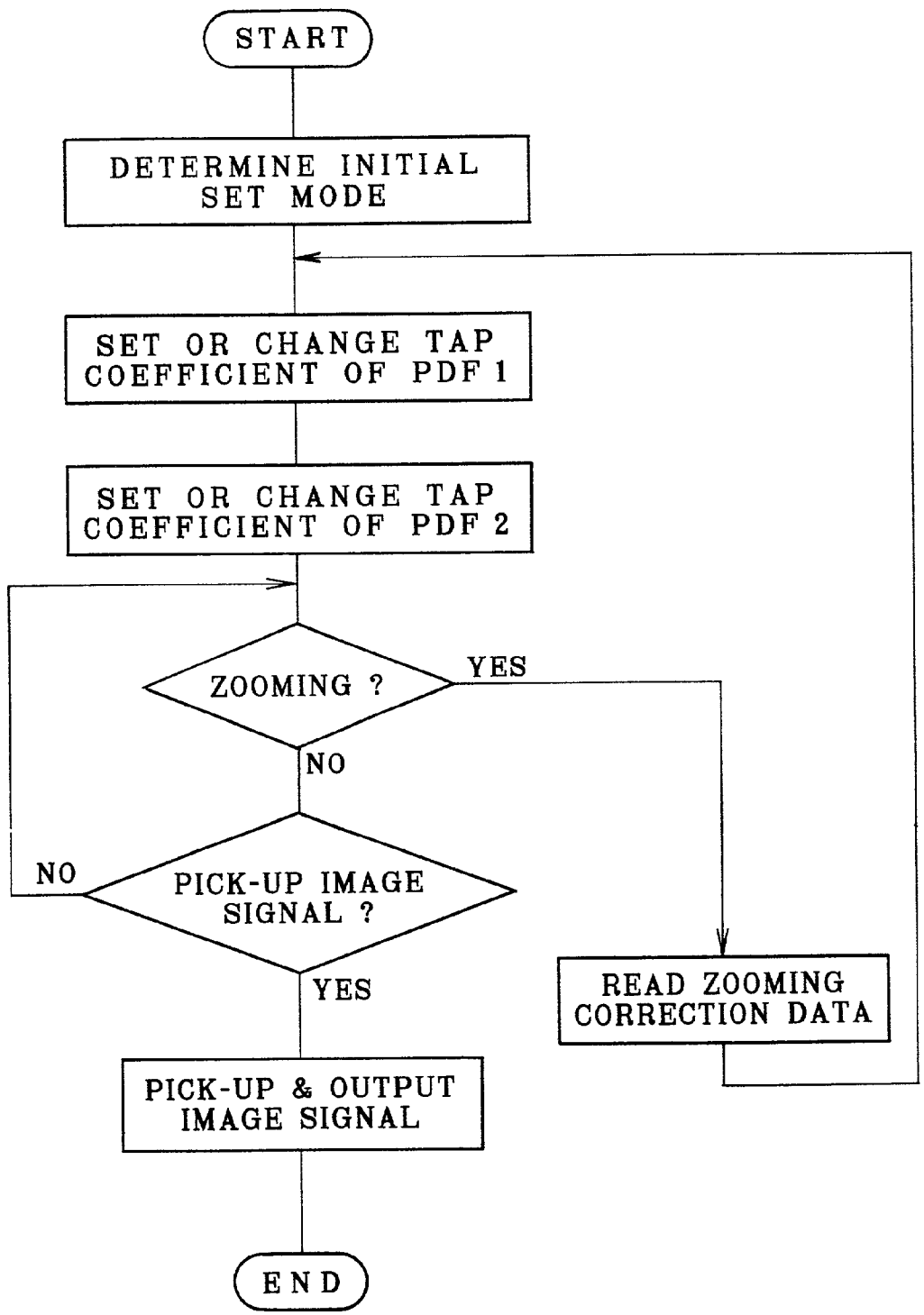
FIG. 6 is a flow chart illustrating a focusing process of the first embodiment.

Now the automatic focusing of the film scanner having the above configurations will be described with reference to the flow chart of FIG. 6.

First, the operator selects one of the above three modes, so that a corresponding one of the three types of initial set value data is read out from the data ROM 40 and is applied as tap coefficients KH and KL to the programmable digital filters 28a and 28b. Thus, the cut-off frequencies fL and fH of the band pass filter 28 are set at those initial set values which are predetermined for each mode. When the operator does not make zooming, the focusing is performed based on the evaluation signal filtered through the band pass filter 28 with the initial set values. That is, the evaluation signal is obtained and integrated in the integration circuit 31, while the focusing lens 10b is moved stepwise. The position of the focusing lens 10b is fed back to the CPU 30 through the focus driver 17 and the stepping motor 17a.

Figure 14:
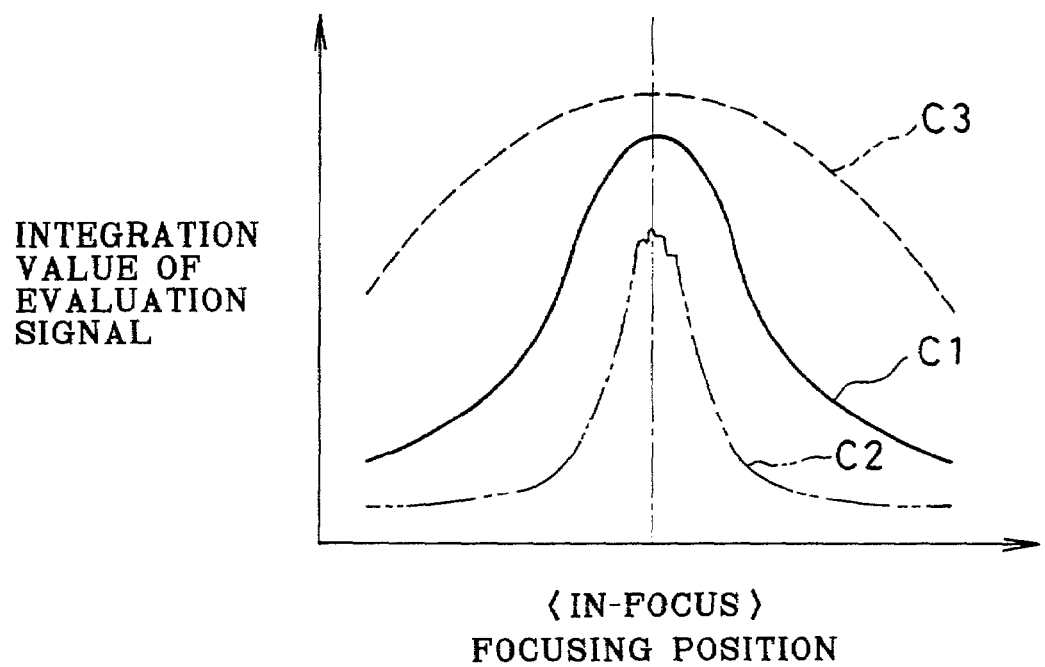
FIG. 14 is a diagram illustrating relationships between integration value of evaluation signal and focusing position.

When the pass band of the band pass filter 28 is proper for the spatial frequency of the scanned photographic image, the integration value of the evaluation signal changes with the focusing position along the curve C1 as shown in FIG. 14, wherein the peak is definite. Since the integration value reaches the peak when the focusing lens 10b reaches the in-focus position, the focusing lens 10b is stopped at a position where the integration value is at the peak.

As the imaging lens 10 is thus focused on the photographic image, the clearest video simulation image is displayed on the CRT monitor 4. Then the operator enters the read-in command for picking up the image signal. Then the three color image signals and/or the composite image signal are output from the three color signal output terminal RGB and/or the composite signal output terminal COMP. The CRT monitor 4 also displays the integration values of the evaluation signal during the focusing in a digital form and as a graph as shown in FIG. 14. Therefore, the operator can objectively confirm the focusing condition of the imaging lens 10 on the CRT monitor 4.

When the spatial frequency band of the photographic image is higher than a standard range that the standard mode is suitable for, that is, when the photographic image contains fine patterns, the operator selects the narrow band mode. Then, the pass band of the band pass filter 28 is limited to a narrower and higher frequency band. If the operator selects the standard mode in that case, the curve of the integration value of the evaluation signal would be like the curve C3 of FIG. 14. On the contrary, when the spatial frequency band of the photographic image is lower than the standard range, that is, when the photographic image has low contrast patterns, the operator selects the wide band mode. Then, the pass band of the band pass filter 28 is widened to a lower frequency band. If the operator improperly selects the standard mode in that case, the curve of the integration value of the evaluation signal would be like the curve C2 of FIG. 14.

Since the curve of the integration value is displayed on the CRT monitor 4, the operator can select the optimum mode so as to adjust the band pass filter 28 to the image patterns. It is also possible to enter appropriate set values through the user interface 3 in the focus mode setting circuit 34 for modifying the cut-off frequencies fH and fL, while observing the CRT monitor 4.

If the operator makes zooming before the read-in command, the zooming correction data is read out from the data ROM 40 in accordance with the zooming position, so that the cut-off frequencies fH and fL of the programmable digital filters 28a and 28b are shifted toward low frequency range. As the imaging lens 10 is moved toward the telephoto range, the spatial frequency band of the pixel signals of the photographic image is shifted toward low frequency range. Therefore, if the cut-off frequencies fH and fL maintain the initial values even while the imaging lens 10 zooms to the telephoto side, the pass band of the band pass filter 28 would be shifted higher relative to the spatial frequency band of the pixel signals.

In that case, the integration value of the consequent evaluation signal would have the undesirable curve C2. Therefore, the cut-off frequencies fH and fL of the programmable digital filters 28a and 28b are shifted toward the low frequency range as the imaging lens 10 zooms toward the telephoto side, as is shown for example in FIG. 5, so the integration value of the evaluation signal has the desirable curve C1.

Furthermore, when to zoom up a low contrast photographic image, the curve of the integration value of the consequent evaluation signal would inevitably be like the curve C3, which is too gentle to determine the precise in-focus position. In that case, it is effective to utilize distribution patterns of emulsion particles on the filmstrip 15. Since the filmstrip 15 has silver salt particles distributed at random on the emulsion surface, and their distribution density is known, it is possible in that case to select the cut-off frequencies fH and fL of the band pass filter 28 on the basis of spatial frequency corresponding to the distribution density of the silver salt particles, in accordance with the zooming position, i.e. the image magnification.

Although the above description has been based on the assumption that the focal length is changed by moving the zooming lens 10a alone, the focusing lens 10b as well as the zooming lens 10a will be moved along the optical axis during the zooming with the imaging lens 10 being a two-group zoom lens. Therefore, it is necessary to conduct tracking and adjusting the positions of the respective lens groups at each zooming positions prior to the shipment.

For this tracking-adjusting, a test subject characterized in a specific spatial frequency band is disposed at a given distance, and the change in spatial frequency during the zooming, which is caused by the change in image magnification, is previously calculated. Then, zooming correction data adapted to the calculated change is written in the data ROM 40. Thereafter, the test subject is picked up while changing the image magnification and reading the zooming correction data at each image magnification steps, and the above described automatic focusing is carried out concurrently. The position of the focusing lens 10b is detected at each zooming position, to produce a tracking correction table. Since the pass band of the band pass filter 28 is shifted to be suitable for the zooming position while the tracking correction table is prepared, the focusing can be conducted with minimum error. In addition, the tracking correction table is almost automatically prepared.

As the programmable digital filters 28a and 28b, a digital filter "12×10-bit Matrix Multiplier LF2250" (trade name), LOGIC Co., is useful which can conduct high-grade filtering operation to obtain more accurate evaluation signal. In the above embodiment, the evaluation signal is produced from the pixel signals of the entire area of the photographic image, it is possible to provide a masking circuit before the band pass filter 28 so as to produce the evaluation signal from those pixel signals which are detected from a part of the photographic image, e.g. a center area of the photographic frame where the main subject of the photographic image is most likely to exist.

The data ROM 40 may store set value data for the individual zooming positions instead of storing the zooming correction data.

However, it is usual for the film scanner to subject the entire area of the image frame to sampling the evaluation signal for focusing, as the film scanner is to scan still images wherein the main subject is often disposed in peripheral area within the image.

Meanwhile, there are going to be a variety of frame sizes even on the same type of filmstrip. Regarding the ISO 135 type, for example, a panoramic size of 36 mm×13 mm and a high vision size of 36 mm×20 mm are added to the conventional full size of 36 mm×24 mm, and one filmstrip can contain these different size image frames. If the image area to evaluate for focusing is fixedly adapted to the full size, the consequent evaluation signal cannot be appropriate for other size image frames as taking unnecessary pixel signals into account in those cases.

It is also known in the art to record every frame in the same size and make different format prints from different areas of the same size frames by assigning a print format or printing area to the individual frame. In that case, masking the photographic image on the filmstrip to scan only the assigned printing area is possible, but it could often result in a malfunction that the film scanner is focused on the rim of the mask aperture where the contrast is the largest in most cases.

Figure 7:
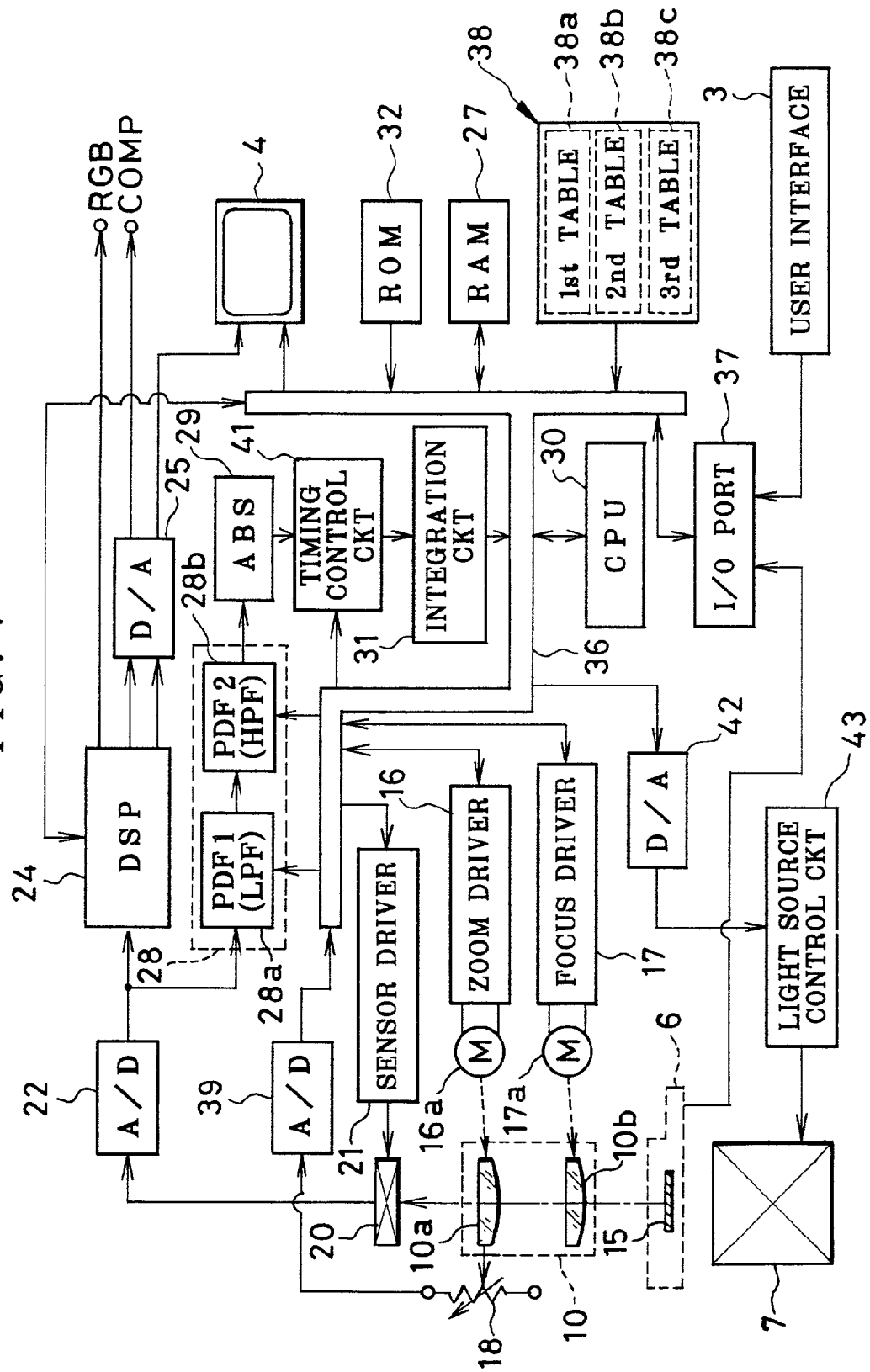
FIG. 7 is a block diagram of a film scanner having an automatic focusing device according to a second embodiment of the invention.

The embodiment shown in FIG. 7 is preferable for solving this problem and also for achieving a quick focusing. The fundamental construction of this embodiment is similar to the first embodiment, so that the same or equivalent elements are designated by the same reference numerals, and their detailed description will be omitted for the sake of brevity.

When a photo film 15 loaded in a film carrier 6 is a negative filmstrip, the negative filmstrip is inserted in a film holder by each filmstrip or as a sheet of limited length, e.g. a sheet of six frames, and then the film holder is placed in the film carrier 6. In case of a positive film, a mount holder is used for holding several frames each mounted in a slide frame, and the mount holder is placed in the film carrier 6. The difference between the film holder and the mount holder is detected by a sensor such as a micro sensor that is built in the film carrier 6. The signal from the sensor of the film carrier 6 is sent to the imaging unit 5 through an I/O port 37, and is processed as a film loading signal and a film type signal. The film type signal constitutes a part of film ID data.

On the other hand, the operator enters the film type of the filmstrip 15 through a user interface 3, and the film type is sent as a command through the I/O port 37 to a CPU 30 of the imaging unit 5. The CPU 30 compares the entered film type command with the film type signal from the film carrier 6, and determines whether it is necessary to make a negative/positive inversion of the image signal for simulating the photographic image on a CRT monitor 4.

Pixel signals are detected from a photographic image on the film 15 through an imaging lens 10 and an image sensor 20, and are time sequentially sent to a digital signal processor (DSP) 24 and a band pass filter 28. The band pass filter 28 detects evaluation signal of a limited spatial frequency band, and an absolute value conversion circuit (ABS) 29 outputs an absolute value of each evaluation signal value to a timing control circuit 41 in a time sequential fashion. The absolute values of the evaluation signal are sorted out by the timing control circuit 41 according to their entrance timing. Since the pixel signals are time sequentially detected by a serial scanning of the two-dimensional photographic image on the film 15, and the evaluation signal and the absolute values thereof are sequentially produced from the pixel signals, it is possible to extract those evaluation signal values which are obtained from a limited area of the photographic image by sorting out the absolute values according to the serial entrance timing to the timing control circuit 41.

Figure 8:
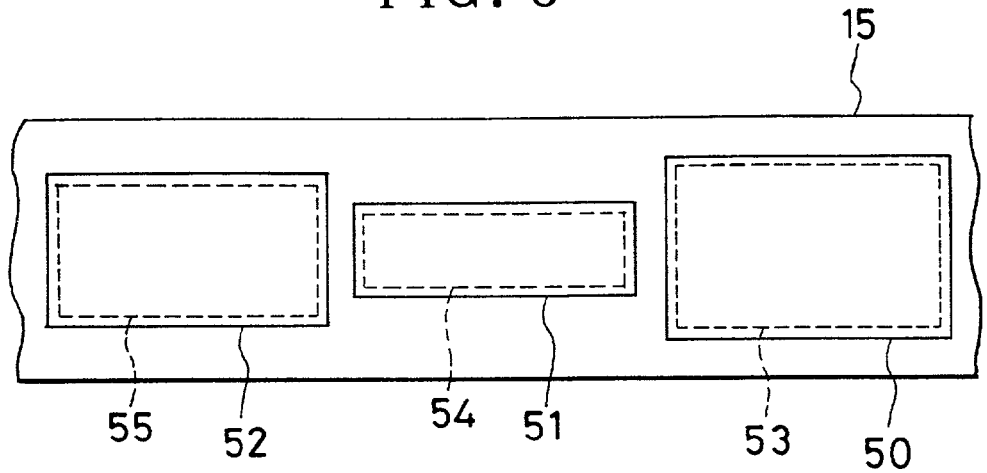
FIG. 8 is an explanatory view of different evaluation areas defined by different frame sizes.

Accordingly, when picking up a full size frame 50 on the film 15, as shown in FIG. 8, it is possible to input only those evaluation signal values which belong to an evaluation area 53 defined within the full size frame 50. In the same way, it is possible to define a corresponding evaluation area 54 or 55 for a panoramic size frame 51 or a high vision size frame 52 respectively. The evaluation area 53, 54 or 55 is automatically defined by the CPU 30 in response to frame size data that corresponds to an effective image area designated by the operator through the user interface.

Specifically, timing data is stored in a first table memory 38a of a data ROM 38 for each of available evaluation areas. The CPU 30 reads out appropriate timing data with reference to the frame size data for the designated effective image area, and feeds it to the timing control circuit 41. So long as the imaging lens 10 stays in the same zooming position, the timing data for the timing control circuit 41 is switched over merely in accordance with the frame size data designating one of the three frame sizes 50, 51 and 52. In addition, the timing data and thus the evaluation area is changed with the zooming position of the imaging lens 10.

Figure 9A:
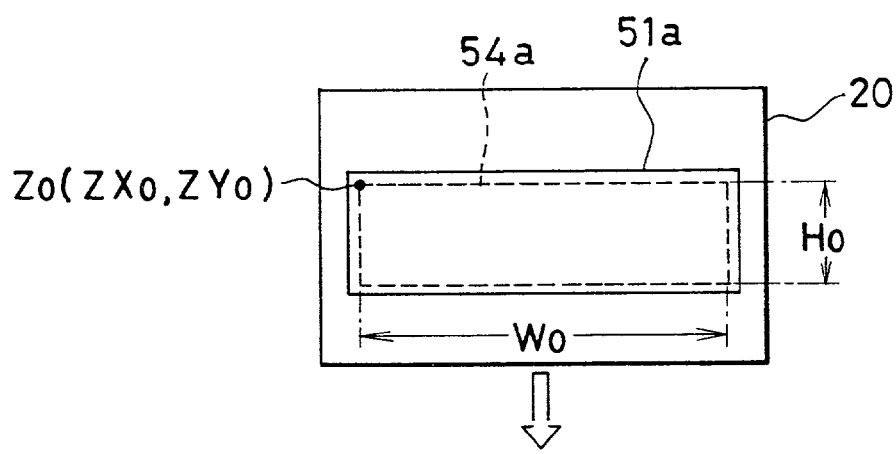
FIGS. 9A and 9B are explanatory views of evaluation areas defined by the zooming position.
Figure 9B:
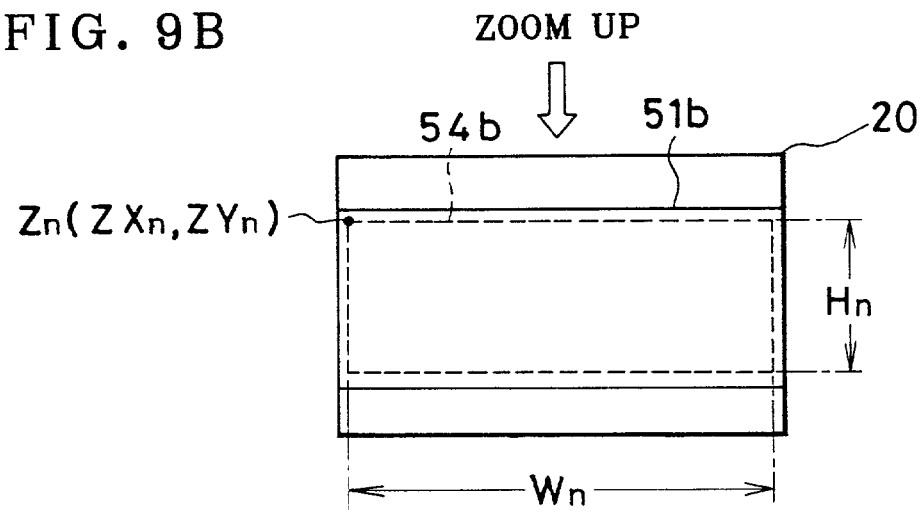

For example, when the panoramic size frame 51 is picked up at a wide-angle position, an image 51a of the panoramic size frame 51 is formed on the image sensor 20 in a size as shown in FIG. 9A, and an evaluation area 54a is defined to be slightly smaller than this image 51a. If the imaging lens 10 moves to a telephoto terminal, an image 51b of the panoramic size frame 51 formed on the image sensor 20 is enlarged as shown in FIG. 9B. Correspondingly, an enlarged evaluation area 54b is defined.

For this purpose, the entire zooming range is sectioned into several steps, and the evaluation areas are determined for each combination of one frame size and one zooming position step. The first table memory 38a stores coordinate data Z, width data W and height data H as the timing data for each evaluation area. The coordinate data Z represents coordinates "(ZX, ZY)" of a pixel of the image sensor 20 that indicates an upper-left corner point of the evaluation area. The width data W represents the number of pixels corresponding to the width of the evaluation area, and the height data H represents the number of pixels corresponding to the height of the evaluation area. For example, when the panoramic size frame 51 is picked up at the wide-angle position, timing data including coordinate data Z0(ZX0, ZY0), width data W0 and height data H0 is read out from the first table memory 38a of the data ROM 38. The CPU 30 defines the evaluation area 54a based on this data, and the timing control circuit 41 sorts out the evaluation signal to be sent to an integration circuit 31 by controlling the input-output timing.

After a zooming, the CPU 30 reads out a combination of coordinate data Zn(ZXn, ZYn), width data Wn and height data Wn in accordance with the zooming position of the imaging lens 10. Thus, the enlarged evaluation area 54b, for instance, is defined after the panoramic size frame 51 is zoomed up. It is possible that the image formed on the image sensor 20 at the telephoto terminal gets larger than the photoelectric surface of the image sensor 20. Even in that case, the evaluation area is automatically defined to be slightly smaller than the photoelectric surface of the image sensor 20.

In a case where every image frame is recorded in the same size on the same film 15, if print format data designating a printing area is optically or magnetically recorded along with each image frame, it is possible to read the print format data through a sensor that may be provided in the film carrier 6, and define an evaluation area in accordance with the designated printing area. Thereby, it is also possible to pick up image signal of those pixels included in the evaluation area, and output as three color image signals or a composite image signal. In that case, it is not always necessary to designate an effective image area for each frame through the user interface 3. Therefore, instead of the frame size data, the print format data is processed in the imaging unit 5 as the film ID data in addition to the film type data.

In this way, those evaluation signal values which are obtained from the evaluation area of the photographic image are integrated by the integration circuit 31 during each vertical synchronizing period of the image sensor 20. The band pass filter 28 is constituted of cascade connected programmable digital filters 28a and 28b whose tap coefficients or cut-off frequencies are adjusted such that the integration value of the evaluation signal changes with the focusing position along the ideal curve C1 of FIG. 14.

However, it is difficult to obtain the curve C1 for whatever photographic image. Moreover, since the spatial frequency of the picked up image signal changes with the zooming, it is still more difficult to quickly determine the peak of the integration value. To achieve quick and accurate focusing, the present invention adopts the following algorithm.

As the imaging lens 10 has two lens groups 10a and 10b, and the focusing lens 10b moves along with the zooming lens 10a to correct the change in focal point resulting from the zooming. That is, the focusing lens 10b moves in the optical axis direction during the zooming even the subject distance being constant. If the film 15 is loaded in a designated standard position, it is possible to optically calculate an offset point of the focusing lens 10b where the imaging lens 10 is focused on the standard subject distance at a particular zooming position.

Therefore, the offset point of the focusing lens 10b are previously calculated for each of predetermined stepwise zooming positions with respect to the standard subject distance, and are stored as the numbers of drive pulses from an initial position in a second table memory 38b of the data ROM 38. The number of drive pulses corresponds to the rotational angle of a stepping motor 17a and thus the movement of the focusing lens 10b. The position of the zooming lens 10a is monitored through a potentiometer 18 and an A/D converter 39, and is classified into one of the zooming position steps. Then, the number of drive pulses stored for that zooming position step is read out to be used for driving the stepping motor 17a through a focusing driver 17. In this way, the focusing lens 10b is definitely moved from the initial position to one of the predetermined offset points in accordance with the position of the zooming lens 10a. The steps of the zooming position provided in the second table memory 38b may be equal to those provided in the first table memory 38a, or may differ from each other.

Since the offset points are determined for the standard subject distance, the imaging lens 10 is not always focused on the film 15 of the film carrier 6 after the focusing lens 10b moves to the selected offset point. If the film 15 is a negative film, the distance of the film 15 to the imaging lens 10 slightly varies depending upon the film type because of the different thickness or other factors. If the film 15 is a positive film, the distance to the imaging lens 10 varies more than the negative film because of the difference in slide frame type and in the mounting position of the slide frames. Therefore, it is necessary to adjust the focusing lens 10b from the offset point, whether the film 15 is negative or positive. To find a precise in-focus position, the focusing lens 10b is moved through a limited focus-scan range around the offset point, while sampling the integration value of the evaluation signal at regular intervals, i.e. during each vertical synchronizing period of the image sensor 20.

As the variation or fluctuation in the subject distance is greater in the positive films compared with the negative films, a narrower focus-scan range is selected for the negative film, while a wider focus-scan range is selected for the positive film. Because it takes a longer time to move the focusing lens 10b through the wider focus-scan range than necessary for the narrower focus-scan range at the same speed, the speed of focus scanning of the focusing lens 10b is also changed between the negative and positive films. For this purpose, a third table memory 38c of the data ROM 38 stores data for determining a start point and a terminal point of the focus scan range in accordance with whether the film 15 is negative or positive.

Figure 10:
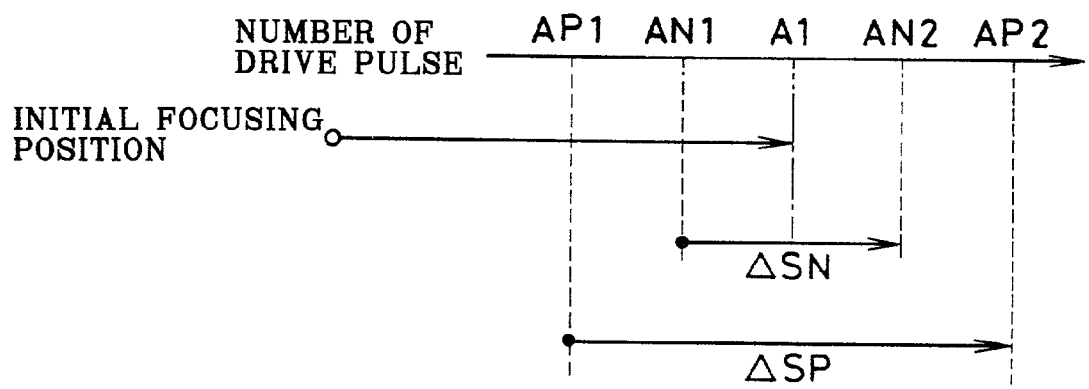
FIG. 10 is an explanatory view illustrating a focusing lens movement control of the second embodiment.

Specifically, as shown in FIG. 10, the third table memory 38c stores data of a wider focus scan range $\Delta SN$ for the negative film as a pair of down-counting and up-counting numbers of the drive pulses from the offset point, and data of a narrower focus scan range $\Delta SP$ for the positive film as another pair of down-counting and up-counting numbers from the offset point. In FIG. 10, A1 represents the number of drive pulses from the initial position to the offset point.

When the zooming position is determined, the number of drive pulses A1 necessary for moving the focusing lens 10b from the initial position to the offset point is determined with reference to the second table memory 38b. Then, if the film 15 is negative, the down-counting number for the focus-scan range $\Delta SN$ is reduced from the number A1, to determine the number of drive pulses AN1 that is necessary for moving the focusing lens 10b from the initial position to the start point of the focus-scan range $\Delta SN$. Also the up-counting number for the focus-scan range $\Delta SN$ is added to the number A1, to determine the number of drive pulses AN2 from the initial position to the terminal point of the focus-scan range $\Delta SN$. If the film 15 is positive, the start point and the terminal point of the focus-scan range $\Delta SP$ are determined as the numbers of drive pulses AP1 and AP2 from the initial position respectively in the same way as for the negative film. It is possible to prepare different focus-scan ranges $\Delta SN$ and $\Delta SP$ for different offset points.

Consequently, the CPU 30 functions as an identification device for identifying the film type based on the film ID data from the user interface 3 or the film carrier 6, and the second and third table memories 38b and 38c in cooperation with the CPU 30 function as a device for determining an offset point and a focus-scan range in accordance with the film ID data.

Figure 11:
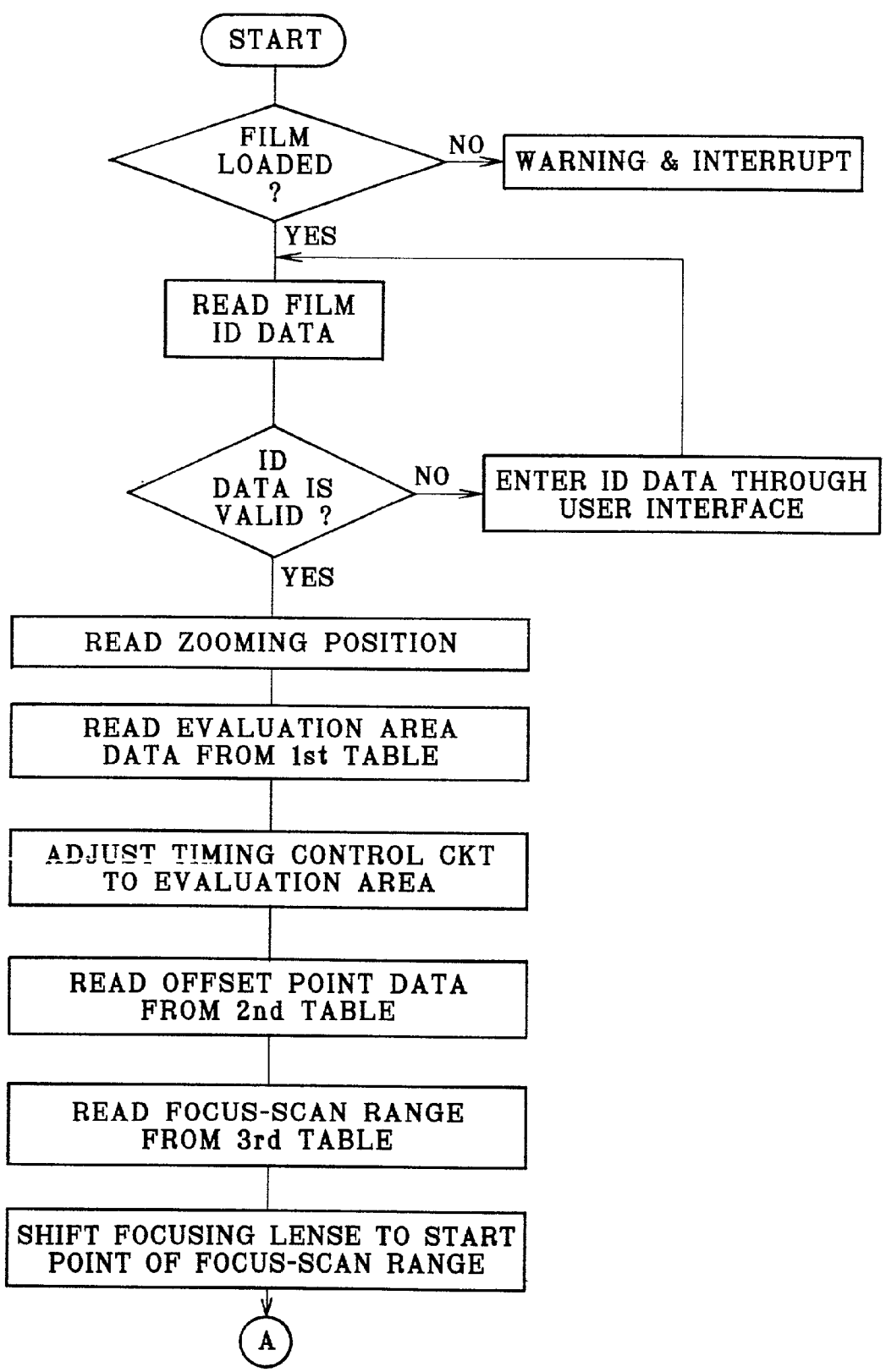

The operation of the embodiment of FIG. 7 will now be described with reference to a flow chart of FIGS. 11 and 12.

When it is determined that the film 15 is loaded in the film carrier 6, the film ID data and the zooming position are detected. The film ID data includes the film type data and the frame size data. The film type data is read through the sensor of the film carrier 6 and is compared with the film type entered through the user interface 3. If the film type indicated by the film type data from the film carrier 6 is not identical to the manually entered film type, the operator enters a correct film type. The frame size data is entered through the user interface 3 or detected from print format data on the film 15 through the film carrier 6.

When the film ID data is determined to be valid, and if the photographic image to scan is a panoramic size frame 51, timing data for the evaluation area 54 is read out from the first table memory 38a of the data ROM 38 and is fed to the timing control circuit 41 through the CPU 30 and a data bus 36. Since the evaluation area 54 is slightly smaller than the panoramic size frame 51, even if any pixel signals are detected from an unexposed circumference surrounding the panoramic size frame 51, these pixel signals are eliminated by the timing control circuit 41, so that they would not have any effect on the focusing. In the same way, if the periphery of the panoramic size frame 51 is masked out, those light beams from the rim of the mask aperture are not used for focusing.

When the imaging lens 10 is zoomed, the evaluation area is modified by timing data stored in the first table memory 38a in accordance with the zooming position. When the zooming position is determined, an offset point determined by the zooming position is read out from the second table memory 38b, as the number of drive pulses A1 necessary for moving the focusing lens 10b from the initial position to the offset point. The number A1 is temporarily stored in a RAM 27. Thereafter, the third table memory 38c is referred to, and the down-counting and up-counting numbers for the focus-scan range $\Delta SN$ or $\Delta SP$ are read out in accordance with the film type data.

If the film 15 is negative, drive pulse numbers AN1 and AN2 corresponding to the start and terminal points of the focus-scan range $\Delta SN$ are calculated from the drive pulse number A1 stored in the RAM 27 and the down-counting and up-counting numbers read out from the third table memory 38c. The calculated drive pulse numbers AN1 and AN2 are stored in the RAM 27.

In that case, the focusing lens 10b is moved from the initial focusing position to the start point by applying the number AN1 of drive pulses to the stepping motor 17a. Thereafter, the evaluation signal is extracted from the pixel signals within the evaluation area determined by the timing control circuit 41, and is integrated in the integration circuit 31. The focusing lens 10b is moved through the determined focus-scan range along the optical axis, while the integration value of the evaluation signal is sampled at the regular intervals.

Figure 12:
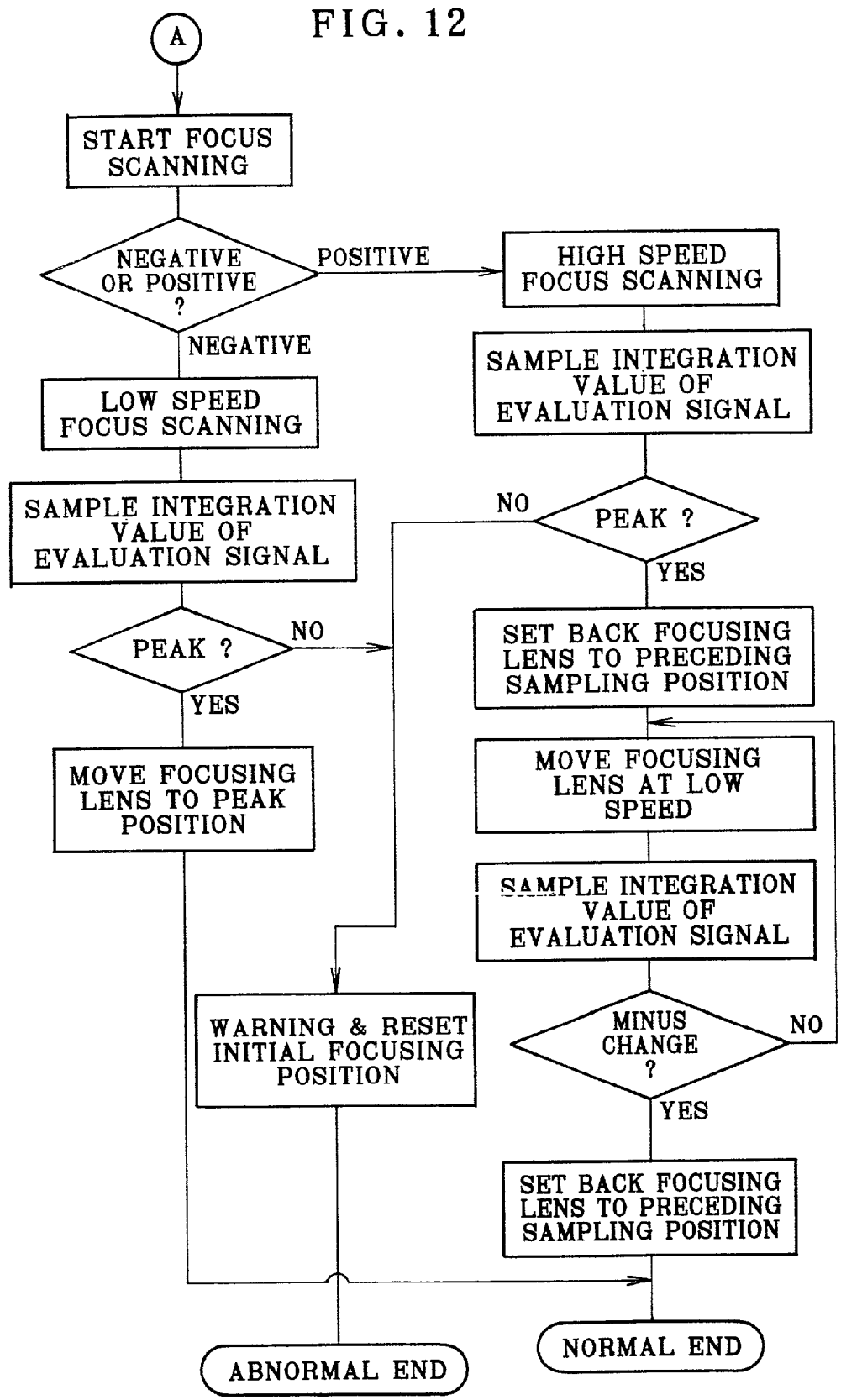
Figure 13:
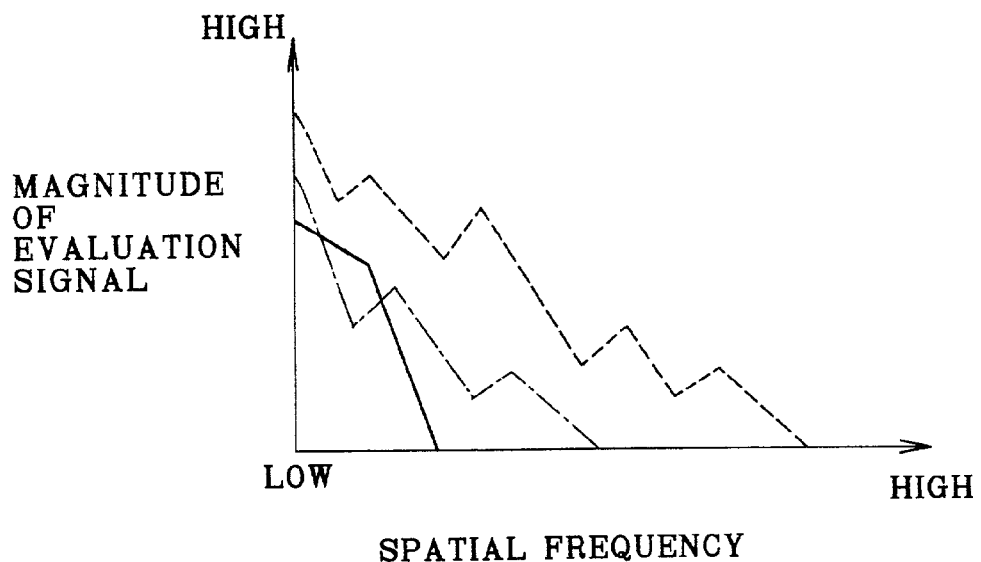
FIG. 13 is a diagram illustrating relationships between magnitude of evaluation signal and spatial frequency regarding three different focusing positions.
Figure 15:
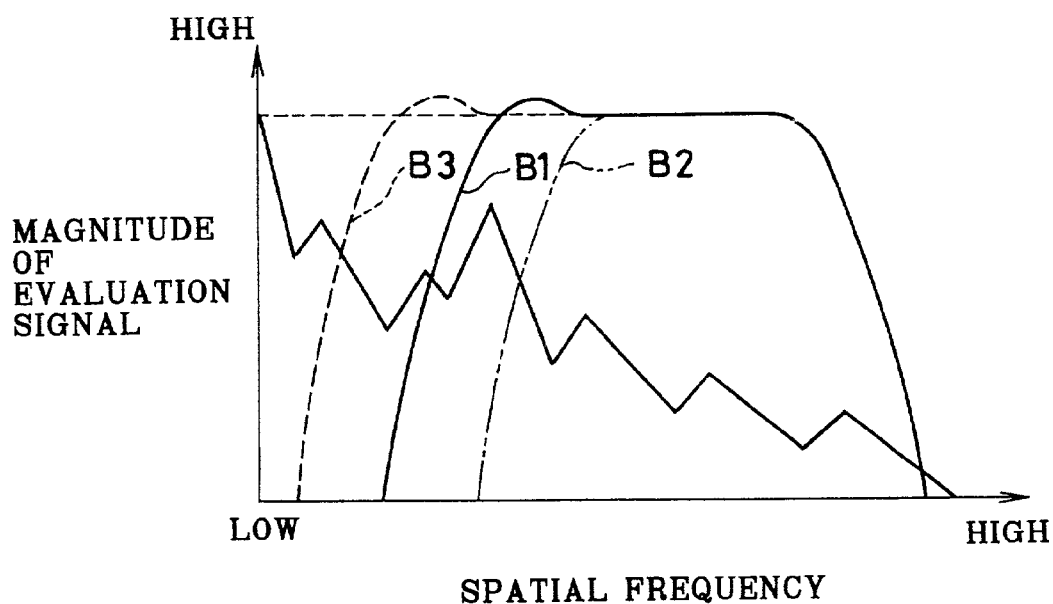
FIG. 15 is a diagram illustrating the relationship between frequency band of evaluation signal and integration value of evaluation signal in connection to FIG. 14.

As shown in FIG. 12, if the film 15 is negative, the focusing lens 10b is moved at a low speed by reducing the frequency of the drive pulses applied to the stepping motor 17a. When the number of drive pulses applied to the stepping motor 17a reaches the value AN2, the focus driver 17 stops driving, and the sampling of the integration value of the evaluation signal is terminated. A plurality of integration values sampled during the focus scanning are sequentially stored in the RAM 27, so that the CPU 30 determines the largest value as a peak value, and also determines the sampling interval at which the peak value is obtained. Since the integration values are sampled synchronously with the movement of the focusing lens 10b, it is possible to correlate the sampling intervals to focusing positions of the focusing lens 10b.

In this way, the peak position or peak sampling position of the focusing lens 10b is determined within the focus-scan range $\Delta SN$. As the peak position can be regarded as the in-focus position, the CPU 30 moves the focusing lens 10b back to the peak position. If it is impossible to determine the peak value, a warning is displayed on the CRT monitor 4, and the focusing lens 10b is reset to the initial focusing position. Thereafter, the CPU 30 terminates the focus scanning as abnormal.

Since the CRT monitor 4 displays the integration values of the evaluation signal during the focusing along with the video simulation image of the photographic image, the operator can correct the tap coefficients of the programmable digital filters 28a and 28b and other commands with reference to the CRT monitor 4, and then start focusing again.

When the focus lens 10b reaches the in-focus position, the video simulation image on the CRT monitor 4 becomes the clearest, so that the operator enters a read-in command through the user interface 3, to start picking up the image signal from the photographic image in this in-focus position. In result, three color image signals or a composite image signal from the digital signal processor 24 is output from a three color signal output terminal RGB or a composite signal output terminal COMP respectively, and is recorded in a recording medium loaded in the disc drive unit 8.

It is to be noted that the focal plane scarcely varies between frames on the same negative filmstrip once it is loaded in the film carrier 6, it is enough for the negative filmstrip to conduct the above focusing process on the first frame alone. That is, the imaging lens 10 can stay in the same focusing position for all frames on the same film 15 if it is a negative filmstrip. Of course, it is necessary to conduct the above focusing process again when another film 15 is loaded in the film carrier 6.

If the film 15 is a positive film, the wider focus-scan range $\Delta SP$ is selected. As the focus-scan range $\Delta SP$ is wide, the focusing lens 10b is first moved at a high speed from a start point to a terminal point of that range $\Delta SP$, which correspond to the drive pulse numbers AP1 and AP2 to the stepping motor 17a respectively. The high speed movement is achieved by increasing the frequency of the drive pulses.

While the focusing lens 10b moves at the high speed through the focus-scan range $\Delta SP$, the integration values of the evaluation signal are sampled at the regular time intervals, i.e. during each vertical synchronizing period of the image sensor 20. Accordingly, the sampling position intervals of the focusing lens 10b get longer in the high speed focus scanning through the focus-scan range $\Delta SP$, compared with the low speed focus scanning for the negative film. That is, the integration values are roughly sampled in the high speed focus scanning for the positive film, and are sequentially stored in the RAM 27. The CPU 30 selects the largest integration value as a peak value among from the stored integration values, and determines the sampling interval and thus the sampling position at which the peak value is obtained. After determining the peak sampling position, the CPU 30 sets back the focusing lens 10b to the preceding sampling position that is immediately before the peak sampling position in the focus scanning direction.

Thereafter, the focusing lens 10b is moved toward the terminal point of the focus-scan range ΔSP again but at a lower speed. The integration values of the evaluation signal are sampled during the low speed focus canning, and the CPU 30 seriatim compares the integration value with the receding integration value. When the newly sampled integration value is smaller than the preceding one, i.e. when a minus change occurs in the integration value, the preceding sampling position is determined as the in-focus position, so that the focusing lens 10b is set back to the preceding sampling position of the low speed focus scanning.

In this way, for the positive film 15, rough and high speed focus scanning is conducted throughout the wider range ΔSP, to detect a peak position of the sampled integration values. Thereafter, fine and low speed focus scanning is conducted from a position before the peak position toward the terminal point till a real peak is detected. Consequently, the in-focus position can be determined more quickly than when the focusing lens 10b is moved at the low speed through the wider focus-scan range ΔSP. If it is impossible to determine the peak of the integration value, the focus scanning is terminated as abnormal.

Since the focusing for the positive film is accomplished when the integration value decreases for the first time during the low speed focus scanning, if there is any subsidiary peak before the real peak, the focusing lens 10b may be positioned at this subsidiary peak position. However, such a case can hardly happen. Even if the focusing lens 10b should be positioned at such a subsidiary peak position, the subsidiary peak position must be close to the real peak position, so that this focus deviation will be covered up by the depth of field of the imaging lens 10. To improve the reliability, it is possible to move the focusing lens 10b at the low speed through a range around the peak position detected by the high speed focus scanning, e.g. from the preceding sampling position to the succeeding sampling position of the high seed focus scanning, and then return the focusing lens 10b to a position where the peak value is sampled during the low speed focus scanning.

It is possible to set back the focusing lens 10b to an intermediate position between the present sampling position and the preceding sampling position when the minus change of the integration value is detected.

After the focusing lens 10b is set to the in-focus position in this way, the image signal is picked up responsive to a read-in command through the user interface 3, and three color image signals or a composite image signal is output from the three color signal output terminal RGB or the composite signal output terminal COMP in the same way as for the negative film. As the mounting conditions of the positive film can vary even between the same type slide frames, the subject distance from the film surface to the imaging lens 10 can often vary between the frames. Accordingly, it is desirable for the positive film to conduct the above focusing process for each frame. Therefore, as for the positive film, the focusing lens 10b is automatically reset to the initial focusing position in response to a one-frame advance signal that is entered through the user interface 3 or detected by the film carrier 6.

As described so far, the evaluation area, and the offset point and the focus-scan range of the focusing lens 10b are automatically determined in accordance with the frame size, the zooming position and the film type with reference to the table memories 38a to 38c, the focusing of the imaging lens 10 is performed quickly and reliably by use of a microcomputer for any type of photographic image.

In either embodiment, it is possible to detect the position of the zooming lens 10a based on the number of driving pulses applied from the zoom driver 16 to the stepping motor 16a, instead of the voltage signal from the potentiometer 18. It is of course possible to apply the present invention to a film scanner whose imaging zoom lens consists of three or more lens groups.

Thus, the present invention should not be limited to the above described embodiments but, on the contrary, various modification may be possible to those skilled in the art without departing from the scope of claims attached hereto.

What is claimed is:

1. An automatic focusing device for a film scanner having a zoom lens as an imaging lens for projecting an image recorded on photo film onto an image sensor, the device comprising:
    a film type identifier for identifying film type of the photo film;
    a focus-scan range definer for defining a focus-scan range in accordance with the identified film type;
    a sampler for sampling pixel signals from the image sensor at different focusing positions within the focus-scan range of the imaging lens;
    a band pass filter for producing evaluation signals from the pixel signals, the evaluation signals being correlative with spatial frequencies of the image, and for extracting those evaluation signals within a given frequency band, the band pass filter being constituted of programmable digital filters such that the frequency band is modified in cooperation with zooming of the imaging lens;
    an integrator for obtaining an integration value of the extracted evaluation signals at one focusing position; and
    a controller for controlling the focusing position of the imaging lens based on the integration values obtained at different focusing positions.

2. An automatic focusing device as claimed in claim 1, further comprising a motor for moving the imaging lens to the different focusing positions, and a motor driver for driving the motor at different speeds depending upon the film type.

3. An automatic focusing device for a film scanner having a zoom lens as an imaging lens for projecting an image recorded on photo film onto an image sensor, the device comprising:
    a lens driving mechanism for changing focusing position or zooming position of the imaging lens;
    a lens position detector for detecting focusing position and zooming position of the imaging lens;
    a film type identifier for identifying film type of the photo film;
    a focus-scan range definer for defining a focus-scan range in accordance with the identified film type;
    a sampler for sampling pixel signals from the image sensor at different focusing positions within the focus-scan range of the imaging lens;
    a band pass filter for producing evaluation signals from the pixel signals, the evaluation signals being correlative with spatial frequencies of the image, and for extracting those evaluation signals within a given frequency band, the band pass filter being constituted of programmable digital filters such that the frequency band is adjustable;

a data memory storing set values for the frequency band of the band pass filter with reference to the data memory in accordance with the zooming position detected by the lens position detecting means;

an integrator for obtaining an integration value of the evaluation signals at each sampling interval;

a peak detector for detecting a peak value of the integration values obtained at the different focusing positions; and a controller for controlling the lens driving mechanism to set the imaging lens at a focusing position where the peak value is obtained.

4. An automatic focusing device as claimed in claim 3, wherein the lens driving mechanism changes the focusing position or zooming position of the imaging lens at different speeds depending upon the film type.

5. An automatic focusing device for a film scanner, the automatic focusing device comprising:

an imaging lens for projecting an image recorded on a photo film onto an image sensor, the imaging lens including a zooming lens;

a frame size designator for designating an effective image area on the photo film based on at least one of a user input and information recorded on the photo film;

an evaluation area definer for defining an evaluation area on the image sensor in accordance with the designated effective image area;

a sampler for sampling pixel signals from the image sensor at different focusing positions of the imaging lens, said sampler further including a film type identifier for identifying film type of the photo film, and a focus-scan range definer for defining a focus-scan range in accordance with the identified film type, wherein the different focusing positions at which pixel signals are sampled are within the focus-scan range;

an evaluation signals producer for producing evaluation signals from the pixel signals obtained from the evaluation area, the evaluation signals being correlative with spatial frequencies of the effective image area;

an integrator for obtaining an integration value of the evaluation signals at one focusing position;

a controller for controlling the focusing position of the imaging lens based on the integration values obtained at the different focusing positions; and a zooming position detector for detecting a position of the zooming lens, wherein the evaluation area definer defines the evaluation area in accordance with the effective imaging area and the position of the zooming lens.

6. An automatic focusing device as claimed in claim 5, further comprising a motor for moving the imaging lens to the different focusing positions, and a motor driver for driving the motor at different speeds depending upon the film type.

7. An automatic focusing device as claimed in claim 5, further comprising:

a first table memory storing data of evaluation areas to be defined in relation to predetermined effective image areas;

a second table memory storing data of focus-scan ranges to be defined in accordance with the film type; and a third table memory storing offset amounts of the focusing lens in relation to zooming positions of the zooming lens, wherein the start point and the terminal point of the focus-scan range are shifted in accordance with an offset amount of the focusing lens determined with reference to the third table memory in accordance with the detected zooming position.

8. An automatic focusing device as claimed in claim 7, wherein the first table memory allocates one evaluation area to each combination of one effective image area and one zooming position, so that the evaluation area is determined by the designated effective image area in combination with the detected zooming position.

* * * * *